(12) United States Patent
Nogami et al.

(10) Patent No.: US 10,411,295 B2
(45) Date of Patent: Sep. 10, 2019

(54) IONIC CONDUCTOR AND METHOD FOR PRODUCING THE SAME

(71) Applicants: MITSUBISHI GAS CHEMICAL COMPANY, INC., Tokyo (JP); TOHOKU TECHNO ARCH CO., LTD., Miyagi (JP)

(72) Inventors: Genki Nogami, Niigata (JP); Mitsugu Taniguchi, Niigata (JP); Atsushi Unemoto, Miyagi (JP); Motoaki Matsuo, Miyagi (JP); Shinichi Orimo, Miyagi (JP)

(73) Assignees: MITSUBISHI GAS CHEMICAL COMPANY, INC., Tokyo (JP); TOHOKU TECHNO ARCH CO., LTD., Miyagi (JP)

( * ) Notice: Subject to any disclaimer, the term of this patent is extended or adjusted under 35 U.S.C. 154(b) by 125 days.

(21) Appl. No.: 15/531,565

(22) PCT Filed: Oct. 26, 2015

(86) PCT No.: PCT/JP2015/080128
§ 371 (c)(1),
(2) Date: May 30, 2017

(87) PCT Pub. No.: WO2016/103894
PCT Pub. Date: Jun. 30, 2016

(65) Prior Publication Data
US 2017/0338512 A1 Nov. 23, 2017

(30) Foreign Application Priority Data
Dec. 22, 2014 (JP) .................................. 2014-258212

(51) Int. Cl.
*H01M 10/0562* (2010.01)
*H01M 10/0525* (2010.01)
(Continued)

(52) U.S. Cl.
CPC .......... *H01M 10/0562* (2013.01); *H01B 1/10* (2013.01); *H01B 1/122* (2013.01);
(Continued)

(58) Field of Classification Search
CPC ............. H01M 4/134; H01M 10/0562; H01M 10/0585; H01M 10/0525
See application file for complete search history.

(56) References Cited

U.S. PATENT DOCUMENTS

2007/0160911 A1 7/2007 Senga et al.
2011/0117440 A1 5/2011 Maekawa et al.
(Continued)

FOREIGN PATENT DOCUMENTS

CN 103000934 A 3/2013
JP 2012-209104 10/2012
(Continued)

OTHER PUBLICATIONS

Yamauchi et al., "Preparation and evaluation of highly lithium ion conductive Li2S—P2O5—LiBH4", The Symposium on Solid State Ionics Society in Japan Koen Yokoshu, 38th, p. 190-191; 2012.*
(Continued)

*Primary Examiner* — Kenneth J Douyette
(74) *Attorney, Agent, or Firm* — Greenblum & Bernstein, P.L.C.

(57) ABSTRACT

According to one embodiment of the present invention, provided is an ionic conductor comprising lithium (Li), borohydride ($BH_4^-$), phosphorus (P), and sulfur (S), wherein, in X-ray diffraction (CuKα: λ=1.5405 Å), the ionic conductor has diffraction peaks, at least, at 2θ=14.4±1.0 deg, 15.0±1.0 deg, 24.9±1.0 deg, 29.2±1.5 deg, 30.3±1.5 deg, 51.1±2.5 deg and 53.5±2.5 deg.

9 Claims, 7 Drawing Sheets

(51) Int. Cl.
  *H01B 13/00* (2006.01)
  *H01B 1/12* (2006.01)
  *H01B 1/10* (2006.01)
  *H01M 10/0585* (2010.01)

(52) U.S. Cl.
  CPC ........ *H01B 13/00* (2013.01); *H01M 10/0525* (2013.01); *H01M 10/0585* (2013.01); *H01M 2300/0068* (2013.01)

(56) References Cited

U.S. PATENT DOCUMENTS

| | | |
|---|---|---|
| 2012/0251871 A1 | 10/2012 | Suzuki et al. |
| 2014/0147753 A1 | 5/2014 | Homma et al. |
| 2015/0340734 A1 | 11/2015 | Homma et al. |

FOREIGN PATENT DOCUMENTS

| | | |
|---|---|---|
| JP | 2012-209106 | 10/2012 |
| JP | 5187703 | 4/2013 |
| WO | 2009/139382 | 11/2009 |
| WO | 2014/125633 A1 | 8/2014 |

OTHER PUBLICATIONS

European Search Report issued with respect to Application No. 15872463.3, dated Jun. 13, 2018.

Motoaki Matsuo et al., "Lithium superionic conduction in lithium borohydride accompanied by structural transition"; Applied Physics Letters, 91; 2007; pp. 224103.

Hideki Maekawa et al., "Halide-Stabilized $LiBH_4$, a Room-Temperature Lithium Fast-Ion Conductor"; Journal of American Chemical Society, vol. 131, No. 3; Jan. 2, 2009; pp. 894-895.

Akihiro Yamauchi et al., "Preparation and ionic conductivites of $(100-\chi)(0.75Li_2S-0.25P_2S_5)-\chi LiBH_4$ glass electrolytes"; Journal of Power Sources, vol. 244; 2013; pp. 707-710.

Atsushi Unemoto et al., "Recent progress of all-solid-state lithium rechargeable batteries: Application of complex hydride-based solid electrolytes"; Oyo Butsuri, vol. 83, No. 2; 2014; pp. 108-111.

International Search Report issued in Patent Application No. PCT/JP2015/080128, dated Nov. 17, 2015.

\* cited by examiner

IONIC CONDUCTOR AND METHOD FOR PRODUCING THE SAME

TECHNICAL FIELD

The present invention relates to an ionic conductor and a method for producing the same.

BACKGROUND ART

In recent years, lithium-ion rechargeable batteries have been increasingly required for intended uses such as portable information terminal, portable electronic equipment, electric cars, hybrid electric cars, and further, a stationary power storage system. However, conventional lithium-ion rechargeable batteries comprise a flammable organic solvent as a liquid electrolyte, and thus, the conventional lithium-ion rechargeable batteries need strong exterior materials for preventing the leakage of the organic solvent. In addition, in the case of portable personal computers and the like, these devices need to have a structure for coping with a possible risk of the leakage of such a liquid electrolyte. Hence, the lithium-ion rechargeable batteries would cause restriction to the structures of devices.

Moreover, the intended use of the lithium-ion rechargeable batteries has widened to moving bodies such as automobiles or airplanes, and stationary-type lithium-ion rechargeable batteries have been required to have a high volume. Under such circumstances, safety has been more emphasized than before, and it has been focused on the development of all-solid-state lithium-ion rechargeable batteries, which do not comprise harmful substances such as organic solvents.

As a solid electrolyte used in such all-solid-state lithium-ion rechargeable batteries, the use of an oxide, a phosphorus compound, an organic polymer, a sulfide, etc. has been studied.

However, an oxide or a phosphorus compound has such properties that the particles thereof are hard. Accordingly, when a solid electrolyte layer is molded using such a material, it is generally necessary to sinter it at a high temperature of 600° C. or higher, and thus, it takes labor and time. Furthermore, when an oxide or a phosphorus compound is used as a material for a solid electrolyte layer, it is disadvantageous in that the interfacial resistance between the material and an active material is increased. The organic polymer is disadvantageous in that it has low lithium ion conductivity at room temperature, and as the temperature is decreased, the conductivity is drastically decreased.

Regarding a novel Li-ion solid state conductor, it has been reported in 2007 that the high-temperature phase of $LiBH_4$ has high lithium ion conductivity (Non Patent Literature 1). Since $LiBH_4$ has a low density, a light battery can be produced when such $LiBH_4$ is used as a solid electrolyte. Further, since $LiBH_4$ is stable even at a high temperature (e.g., approximately 200° C.), it is also possible to produce a heat-resistant battery using the $LiBH_4$.

However, $LiBH_4$ is problematic in that its lithium ion conductivity is largely decreased at lower than the phase transition temperature, 115° C. As such, in order to obtain a solid electrolyte having high lithium ion conductivity even at lower than the phase transition temperature, 115° C., a solid electrolyte prepared by combining $LiBH_4$ with an alkaline metal compound has been proposed. For example, in 2009, it has been reported that a solid solution prepared by adding LiI to $LiBH_4$ is able to keep a high-temperature phase even at room temperature (Non Patent Literature 2 and Patent Literature 1).

As a further means for improving lithium ion conductivity, it has been proposed to use, as a solid electrolyte, a glass obtained by mixing a sulfide solid electrolyte 0.75 $Li_2S$-0.25 $P_2S_5$ with $LiBH_4$ and subjecting the mixture to a mechanical milling treatment (Non Patent Literature 3). This glass solid electrolyte has high lithium ion conductivity at room temperature ($1.6 \times 10^{-3}$ S/cm), but since it mainly comprises a sulfide solid electrolyte, it has a high density, and thus, the glass solid electrolyte is disadvantageous that a solid electrolyte layer has a high weight, when the glass solid electrolyte is used to form the solid electrolyte layer. Further, the glass solid electrolyte is also problematic in that the interfacial resistance between a current collector or an electrode layer (hereinafter, a positive electrode layer and a negative electrode layer are collectively referred to as an "electrode layer" at times) and a solid electrolyte layer is increased, when such a solid electrolyte layer is used to produce an all-solid-state battery.

CITATION LIST

Patent Literature

Patent Literature 1: Japanese Patent No. 5187703

Non Patent Literature

Non Patent Literature 1: Applied Physics Letters (2007) 91, p. 224103
Non Patent Literature 2: JOURNAL OF THE AMERICAN CHEMICAL SOCIETY (2009), 131, pp. 894-895
Non Patent Literature 3: Journal of Power Sources (2013), 244, pp. 707-710

SUMMARY OF INVENTION

Technical Problem

It is an object of the present invention to provide an ionic conductor having various excellent properties such as ion conductivity and mechanical strength, and a method for producing the same.

Solution to Problem

The present invention is, for example, as follows:
[1] An ionic conductor comprising lithium (Li), borohydride ($BH_4^-$), phosphorus (P), and sulfur (S), wherein, in X-ray diffraction (CuKα: λ=1.5405 Å), the ionic conductor has diffraction peaks, at least, at 2θ=14.4±1.0 deg, 15.0±1.0 deg, 24.9±1.0 deg, 29.2±1.5 deg, 30.3±1.5 deg, 51.1±2.5 deg and 53.5±2.5 deg.
[1-1] An ionic conductor comprising lithium (Li), borohydride ($BH_4^-$), phosphorus (P), and sulfur (S), wherein, in X-ray diffraction (CuKα: λ=1.5405 Å), the ionic conductor has diffraction peaks, at least, at 2θ=14.4±1.0 deg, 15.0±1.0 deg, 24.9±1.0 deg, 29.2±1.5 deg, 30.3±1.5 deg, 38.7±1.5 deg, 43.9±2.0 deg, 46.6±2.0 deg, 51.1±2.5 deg, 53.5±2.5 deg and 60.6±3.0 deg.
[1-2] The ionic conductor according to the above [1] or [1-1], wherein the interfacial resistance value of lithium/ionic conductor, which is measured with a lithium/ionic conductor/lithium symmetric cell, is 0.5 Ωcm² or less.

[1-3] The ionic conductor according to any one of the above [1] to [1-2], wherein when the ionic conductor is subjected to uniaxial molding (240 MPa) so as to mold it to a disk having a thickness of 1 mm and φ of 8 mm, the disk has a crushing strength of 1.5 kgf or more, and particularly, 1.5 to 2.2 kgf.

[2] A method for producing an ionic conductor, which comprises mixing $LiBH_4$ and $P_2S_5$ at a molar ratio of $LiBH_4$: $P_2S_5$=x: (1−x) [wherein x is greater than 0.85 and 0.98 or less] to obtain a mixture, and subjecting the mixture to a heat treatment, wherein the ionic conductor comprises lithium (Li), borohydride ($BH_4^-$), phosphorus (P), and sulfur (S), and has diffraction peaks, at least, at 2θ=14.4±1.0 deg, 15.0±1.0 deg, 24.9±1.0 deg, 29.2±1.5 deg, 30.3±1.5 deg, 51.1±2.5 deg and 53.5±2.5 deg in X-ray diffraction (CuKα: λ=1.5405 Å).

[2-1] A method for producing an ionic conductor, which comprises mixing $LiBH_4$ and $P_2S_5$ at a molar ratio of $LiBH_4$: $P_2S_5$=x: (1−x) [wherein x is greater than 0.85 and 0.98 or less] to obtain a mixture, and subjecting the mixture to a heat treatment, wherein the ionic conductor comprises lithium (Li), borohydride ($BH_4^-$), phosphorus (P), and sulfur (S), and has diffraction peaks, at least, at 2θ=14.4±1.0 deg, 15.0±1.0 deg, 24.9±1.0 deg, 29.2±1.5 deg, 30.3±1.5 deg, 38.7±1.5 deg, 43.9±2.0 deg, 46.6±2.0 deg, 51.1±2.5 deg, 53.5±2.5 deg and 60.6±3.0 deg in X-ray diffraction (CuKα: λ=1.5405 Å).

[3] The method for producing an ionic conductor according to the above [2] or [2-1], wherein the temperature applied in the heat treatment is 50° C. to 300° C.

[4] The method for producing an ionic conductor according to the above [3], wherein the temperature applied in the heat treatment is 60° C. to 200° C.

[5] The method for producing an ionic conductor according to any one of the above [2] to [4], wherein the mixing is carried out in an inert gas atmosphere.

[5-1] An ionic conductor, which can be produced by the method for producing an ionic conductor according to any one of the above [2] to [5].

[6] A solid electrolyte for all-solid-state batteries, comprising the ionic conductor according to any one of the above [1] to [1-3] and [5-1].

[7] An all-solid-state battery comprising the solid electrolyte for all-solid-state batteries according to the above [6].

Advantageous Effects of Invention

According to the present invention, an ionic conductor having various excellent properties such as ion conductivity, and a method for producing the same, can be provided.

DESCRIPTION OF EMBODIMENTS

Figure 1:
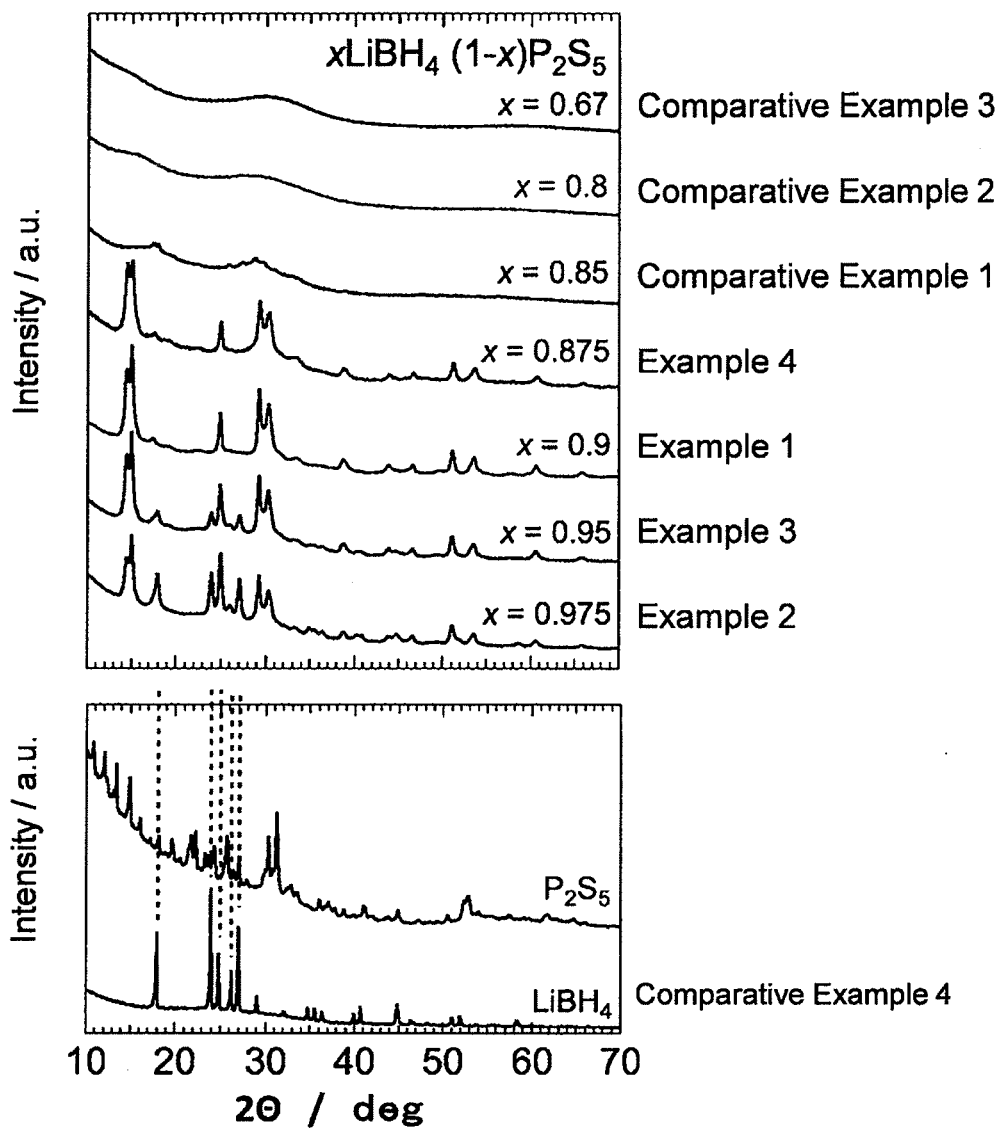
FIG. 1 is a view showing the X-ray diffraction patterns of the ionic conductors obtained in Examples 1 to 4 and Comparative Examples 1 to 4.

Hereinafter, the embodiments of the present invention will be described. It is to be noted that the below-mentioned materials, configurations and the like are not intended to limit the scope of the present invention, and they can be modified in various ways in the range of the gist of the present invention.

1. Ionic Conductor

According to one embodiment of the present invention, an ionic conductor comprising lithium (Li), borohydride ($BH_4^-$), phosphorus (P), and sulfur (S), wherein, in X-ray diffraction (CuKα: λ=1.5405 Å), the ionic conductor has diffraction peaks, at least, at 2θ=14.4±1.0 deg, 15.0±1.0 deg, 24.9±1.0 deg, 29.2±1.5 deg, 30.3±1.5 deg, 51.1±2.5 deg and 53.5±2.5 deg, is provided.

Preferably, the ionic conductor according to the present embodiment further has a diffraction peak(s) at any one or more of 2θ=38.7±1.5 deg, 43.9±2.0 deg, 46.6±2.0 deg and 60.6±3.0 deg.

The ionic conductor according to the present embodiment having the above-described X-ray diffraction peaks has excellent ion conductivity. Crystals having the above-described X-ray diffraction peaks have not been observed in the past time, and thus, the above-described ionic conductor has a novel crystal structure. As described above, $LiBH_4$ is problematic in that the lithium ion conductivity is largely decreased at lower than the phase transition temperature, 115° C. However, in the ionic conductor according to the present embodiment, such a decrease in the lithium ion conductivity does not occur, and excellent ion conductivity can be obtained in a wide temperature range. In addition, the present ionic conductor also has properties in which the ion conductivity hardly fluctuates depending on temperature (namely, a difference in the ion conductivity between a low temperature region and a high temperature region is small). Moreover, since the ionic conductor according to the present embodiment is a crystal, the present ionic conductor is also excellent in that it is mechanically and thermally strong, in comparison to glass.

As described later regarding a production method, the ionic conductor according to the present embodiment has a high content ratio of $LiBH_4$ as a raw material. When compared with a sulfide solid electrolyte (e.g., 0.75 $Li_2S$-0.25 $P_2S_5$ described in Non Patent Literature 3) or an oxide solid electrolyte, $LiBH_4$ is soft. Accordingly, the ionic conductor according to the present embodiment comprising a large amount of $LiBH_4$ can be molded into an electrode layer and a solid electrolyte layer by cold pressing. The thus molded electrode layer and solid electrolyte layer are excellent in terms of strength, in comparison to the case of comprising a sulfide solid electrolyte or an oxide solid electrolyte in a large amount. Therefore, by using the ionic conductor according to the present embodiment, an electrode layer and a solid electrolyte layer, which have high moldability and are hardly broken (i.e., cracks are hardly generated), can be produced. Moreover, since the ionic conductor according to the present embodiment has a low density, a relatively light electrode layer and a relatively light solid electrolyte layer can be produced. Since the weight of the entire battery is thereby reduced, the present ionic conductor is preferable. Furthermore, when the ionic conductor according to the present embodiment is used in a solid electrolyte layer, the interfacial resistance between the solid electrolyte layer and an electrode layer can be reduced.

Specifically, when the ionic conductor according to the present embodiment is used in a solid electrolyte layer, the interfacial resistance value of lithium/ionic conductor, which is measured with a lithium/ionic conductor/lithium symmetric cell, is 0.5 $\Omega cm^2$ or less, preferably 0.3 $\Omega cm^2$ or less, and more preferably 0.2 $\Omega cm^2$ or less.

The ionic conductor according to the present embodiment preferably has X-ray diffraction peaks, at least, at $2\theta=14.4\pm0.8$ deg, $15.0\pm0.8$ deg, $24.9\pm0.8$ deg, $29.2\pm1.2$ deg, $30.3\pm1.2$ deg, $51.1\pm2.0$ deg and $53.5\pm2.0$ deg; more preferably has X-ray diffraction peaks, at least, at $2\theta=14.4\pm0.5$ deg, $15.0\pm0.5$ deg, $24.9\pm0.5$ deg, $29.2\pm0.8$ deg, $30.3\pm0.8$ deg, $51.1\pm1.3$ deg and $53.5\pm1.3$ deg; and particularly preferably has X-ray diffraction peaks, at least, at $2\theta=14.4\pm0.3$ deg, $15.0\pm0.3$ deg, $24.9\pm0.3$ deg, $29.2\pm0.5$ deg, $30.3\pm0.5$ deg, $51.1\pm0.8$ deg and $53.5\pm0.8$ deg.

In addition to the above-described peaks, the present ionic conductor preferably has an X-ray diffraction peak(s) at one or more of $2\theta=38.7\pm1.2$ deg, $43.9\pm1.6$ deg, $46.6\pm1.6$ deg, $60.6\pm2.4$ deg and $65.8\pm2.4$ deg; more preferably has an X-ray diffraction peak(s) at one or more of $2\theta=38.7\pm0.8$ deg, $43.9\pm1.0$ deg, $46.6\pm1.0$ deg, $60.6\pm1.5$ deg and $65.8\pm1.5$ deg; and particularly preferably has an X-ray diffraction peak(s) at one or more of $2\theta=38.7\pm0.5$ deg, $43.9\pm0.6$ deg, $46.6\pm0.6$ deg, $60.6\pm0.9$ deg and $65.8\pm0.9$ deg.

In a preferred embodiment, the present ionic conductor preferably has X-ray diffraction peaks, at least, at $2\theta=14.4\pm0.8$ deg, $15.0\pm0.8$ deg, $24.9\pm0.8$ deg, $29.2\pm1.2$ deg, $30.3\pm1.2$ deg, $38.7\pm1.2$ deg, $43.9\pm1.6$ deg, $46.6\pm1.6$ deg, $51.1\pm2.0$ deg, $53.5\pm2.0$ deg, $60.6\pm2.4$ deg and $65.8\pm2.4$ deg; more preferably has X-ray diffraction peaks, at least, at $2\theta=14.4\pm0.5$ deg, $15.0\pm0.5$ deg, $24.9\pm0.5$ deg, $29.2\pm0.8$ deg, $30.3\pm0.8$ deg, $38.7\pm0.8$ deg, $43.9\pm1.0$ deg, $46.6\pm1.0$ deg, $51.1\pm1.3$ deg, $53.5\pm1.3$ deg, $60.6\pm1.5$ deg and $65.8\pm1.5$ deg; and particularly preferably has X-ray diffraction peaks, at least, at $2\theta=14.4\pm0.3$ deg, $15.0\pm0.3$ deg, $24.9\pm0.3$ deg, $29.2\pm0.5$ deg, $30.3\pm0.5$ deg, $38.7\pm0.5$ deg, $43.9\pm0.6$ deg, $46.6\pm0.6$ deg, $51.1\pm0.8$ deg, $53.5\pm0.8$ deg, $60.6\pm0.9$ deg and $65.8\pm0.9$ deg.

Even if the ionic conductor according to the present embodiment comprises X-ray diffraction peaks other than the above described X-ray diffraction peaks, desired effects are obtained from the present ionic conductor.

The ionic conductor according to the present embodiment comprises, as main components, lithium (Li), borohydride ($BH_4^-$), phosphorus (P) and sulfur (S), but the present ionic conductor may also comprise components other than the aforementioned components. Examples of such other components include oxygen (O), nitrogen (N), fluorine (F), chlorine (CO), bromine (Br), iodine (I), silicon (Si), and germanium (Ge).

Moreover, when Raman spectroscopy is performed on the ionic conductor according to the present embodiment, a large peak derived from borohydride $BH_4^-$) is detected around 2300 $cm^{-1}$. At the same time, in the range of 500 to 350 $cm^{-1}$, three characteristic peaks are detected at $453\pm10$ $cm^{-1}$, $428\pm10$ $cm^{-1}$ and $400\pm10$ $cm^{-1}$.

2. Method for Producing Ionic Conductor

According to one embodiment, the ionic conductor of the present invention is produced by a method comprising a) mixing $LiBH_4$ and $P_2S_5$ at a molar ratio of $LiBH_4$: $P_2S_5$=x: (1−x) [wherein x is greater than 0.85 and 0.98 or less] to obtain a mixture, and b) subjecting the mixture to a heat treatment. The method for producing an ionic conductor is not limited to this method, as long as desired X-ray diffraction peaks can be obtained. For example, the raw materials are not limited to $LiBH_4$ and $P_2S_5$, and the above-described raw materials are replaced with other raw materials such that the other raw materials include the main components of the ionic conductor (i.e., Li, $BH_4^-$, P and S), so as to produce the present ionic conductor.

As $LiBH_4$, generally commercially available $LiBH_4$ can be used. The purity of $LiBH_4$ is preferably 80% or more, and more preferably 90% or more. This is because a desired crystal can be easily obtained by using a compound whose purity is in the above-described range. As $P_2S_5$, generally commercially available $P_2S_5$ can be used. The purity of $P_2S_5$ is preferably 95% or more, and more preferably 97% or more. In addition, instead of $P_2S_5$, phosphorus (P) and sulfur (S) can also be used at a molar ratio corresponding to the $P_2S_5$. In this case, phosphorus (P) and sulfur (S) can be used without particular limitation, as long as they are generally commercially available products.

The mixing ratio between $LiBH_4$ and $P_2S_5$ is $LiBH_4$: $P_2S_5$=x: (1−x) at a molar ratio, and x is greater than 0.85 and 0.98 or less. As mentioned above, by comprising a large amount of $LiBH_4$ as a raw material, an ionic conductor capable of producing an electrode layer and a solid electrolyte layer, which have good moldability and are hardly broken, can be obtained. In the above formula, x is preferably 0.875 to 0.975, more preferably 0.88 to 0.95, and further preferably 0.88 to 0.92. A slight width may be generated in the best mixing ratio between $LiBH_4$ and $P_2S_5$, depending on the purity of a reagent or the mixing of impurities upon the preparation.

The mixing of $LiBH_4$ with $P_2S_5$ is preferably carried out in an inert gas atmosphere. Examples of such an inert gas include helium, nitrogen, and argon, and more preferably it is argon. The water content and oxygen concentration in the inert gas are preferably set at low, and the water content and oxygen concentration in the inert gas are more preferably less than 1 ppm.

The mixing method is not particularly limited. Examples of the mixing method include methods using a grinder, a ball mill, a planetary ball mill, a bead mill, a rotary and revolutionary mixer, a high-speed stirring type mixing device, a tumbler mixer, and the like. Among these devices, a planetary ball mill that is excellent in terms of crushing power and mixing power is more preferable. The mixing is preferably carried out in a dry process, but it can also be carried out in a solvent having resistance to reduction. When a solvent is used, an aprotic non-aqueous solvent is preferable. More specific examples of such a solvent include ether solvents such as tetrahydrofuran or diethyl ether, N,N-dimethylformamide, and N,N-dimethylacetamide.

The mixing time is different depending on the mixing method. For example, in the case of using a planetary ball mill, the mixing time is 0.5 to 24 hours, and preferably 2 to 20 hours.

The mixture obtained as described above is further subjected to a heat treatment, so that crystallization progresses and the ionic conductor according to the present embodiment can be obtained. The heating temperature is generally in a range of 50° C. to 300° C., more preferably in a range of 60° C. to 200° C., and particularly preferably 80° C. to lower than 180° C. If the temperature is lower than the above-described range, crystallization hardly occurs. On the other hand, if the temperature is higher than the above-described range, there are risks such as decomposition of the ionic conductor or degradation of crystals. Since the melting point of metallic lithium is 180° C., the feature that the mixture can be crystallized at a temperature lower than the melting point of metallic lithium would lead to the possibility of crystallization by a heat treatment in a state in which anode metallic lithium is adhered to a solid electrolyte, and this is predominant in the production of an all-solid-state battery. Since the ionic conductor according to the present embodiment can be obtained at a relatively low temperature ranging from 50° C. or higher to lower than 180° C., it is preferable also from the viewpoint of the ease of production.

Although the heating time is slightly changed due to the relationship with the heating temperature, crystallization is sufficiently carried out generally in a range of 0.1 to 12 hours. The heating time is preferably 0.3 to 6 hours, and more preferably 0.5 to 4 hours. Heating at a high temperature for a long period of time is not preferable because it may cause degradation of the ionic conductor.

According to another embodiment of the present invention, an ionic conductor that can be produced by the above-described production method is provided.

3. All-Solid-State Battery

The ionic conductor according to the present embodiment can be used as a solid electrolyte for all-solid-state batteries. Therefore, according to one embodiment of the present invention, a solid electrolyte for all-solid-state batteries, comprising the above-described ionic conductor, is provided. In addition, according to a further embodiment of the present invention, an all-solid-state battery comprising the above-described solid electrolyte for all-solid-state batteries is provided.

In the present description, the all-solid-state battery is an all-solid-state battery in which lithium ions play a role in electrical conduction, and in particular, it is an all-solid-state lithium-ion rechargeable battery. The all-solid-state battery has a structure in which a solid electrolyte layer is disposed between a positive electrode layer and a negative electrode layer. The ionic conductor according to the present embodiment may be comprised as a solid electrolyte in any one or more of a positive electrode layer, a negative electrode layer and a solid electrolyte layer. When the present ionic conductor is used in electrode layers, it is preferable to use the ionic conductor in a positive electrode layer, rather than in a negative electrode layer. This is because the positive electrode layer hardly causes side reactions. When the ionic conductor according to the present embodiment is comprised in either a positive electrode layer or a negative electrode layer, the ionic conductor is used in combination with a cathode active material or an anode active material for known lithium-ion rechargeable batteries. As a positive electrode layer, a bulk-type positive electrode layer, in which an active material is mixed with a solid electrolyte, is preferably used, since it has a large volume per single cell.

The all-solid-state battery is produced by molding the aforementioned individual layers and then laminating them on one another. The method of molding each layer and the lamination method are not particularly limited. Examples of the method include: a method of forming a film, which comprises dispersing a solid electrolyte and/or an active material in a solvent to prepare slurry, and then applying the slurry by a doctor blade method, spin coating, etc., followed by rolling the resultant; a gas phase method of carrying out film formation and lamination according to a vacuum evaporation method, an ion plating method, a sputtering method, a laser ablation method, etc.; and a pressing method, which comprises forming powders according to hot pressing or cold pressing that does not involve high temperature, and then laminating them. Since the ionic conductor according to the present embodiment is relatively soft, it is particularly preferable to carry out molding and lamination according to pressing, so as to produce a battery. Moreover, a positive electrode layer can also be processed into a film according to a sol-gel method.

When individual layers are integrally molded by pressing, the applied pressure is preferably 50 to 800 MPa, and more preferably 114 to 500 MPa. By performing pressing in the above-described pressure range, a layer having a few voids between particles and good adhesiveness can be obtained. Thus, from the viewpoint of ion conductivity, the aforementioned pressure range is preferable. Application of an unnecessarily high pressure needs the use of a pressure device or a molding vessel each consisting of an expensive material, and also causes the shortening of the useful life of such devices, and thus, it is not practical.

EXAMPLES

Hereinafter, the present invention will be described in more detail in the following examples. However, these examples are not intended to limit the content of the present invention.

Preparation of Ionic Conductor

Example 1

In a glove box in an argon atmosphere, $LiBH_4$ (manufactured by Sigma-Aldrich, purity ≥95%) and $P_2S_5$ (manufactured by Sigma-Aldrich, purity: 99%) were weighed to result in a molar ratio of $LiBH_4$: $P_2S_5$=0.90:0.10 [wherein when $LiBH_4$: $P_2S_5$=x: (1−x), x=0.90], and they were then mixed with each other in an agate mortar. Subsequently, the obtained mixture was poured into a 45-mL SUJ-2-made pot, then SUL-2-made balls ($\phi$: 7 mm, 20 balls) were placed therein, and the pot was then completely hermetically sealed. This pot was equipped in a planetary ball mill (manufactured by Fritsch, P7), and was then subjected to mechanical milling at a rotation number of 400 rpm for 2 hours. Thereafter, the reaction mixture was subjected to a heat treatment in an Ar-sealed atmosphere at 150° C. for 2 hours, to obtain an ionic conductor (0.90 $LiBH_4$-0.10 $P_2S_5$).

Examples 2 to 4

An ionic conductor was produced in the same manner as that of Example 1, with the exception that the mixing ratio between $LiBH_4$ and $P_2S_5$ was changed. When the molar ratio between $LiBH_4$ and $P_2S_5$ was set at $LiBH_4$: $P_2S_5$=x: (1−x), the x values were set as follows: x=0.975 (Example 2), x=0.95 (Example 3), and x=0.875 (Example 4).

Comparative Examples 1 to 3

An ionic conductor was produced in the same manner as that of Example 1, with the exception that the mixing ratio between LiBH$_4$ and P$_2$S$_5$ was changed. When the molar ratio between LiBH$_4$ and P$_2$S$_5$ was set at LiBH$_4$: P$_2$S$_5$=x: (1−x), the x values were set as follows: x=0.85 (Comparative Example 1), x=0.80 (Comparative Example 2), and x=0.67 (Comparative Example 3).

Comparative Example 4

In a glove box in an argon atmosphere, LiBH$_4$ (manufactured by Sigma-Aldrich, purity ≥95%) was weighed, and was then crushed in an agate mortar to obtain an ionic conductor (LiBH$_4$).

Comparative Example 5

In a glove box in an argon atmosphere, LiBH$_4$ (manufactured by Sigma-Aldrich, purity ≥95%) and LiI (manufactured by Sigma-Aldrich, purity: 99.999%) were weighed to result in a molar ratio of LiBH$_4$: LiI=0.75:0.25, and they were then mixed with each other in an agate mortar. Subsequently, the obtained mixture was poured into a 45-mL SUJ-2-made pot, then SUL-2-made balls (φ: 7 mm, 20 balls) were placed therein, and the pot was then completely hermetically sealed. This pot was equipped in a planetary ball mill (manufactured by Fritsch, P7), and was then subjected to mechanical milling at a rotation number of 400 rpm for 5 hours, to obtain an ionic conductor (0.75 LiBH$_4$-0.25 LiI).

Comparative Example 6

In a glove box in an argon atmosphere, Li$_2$S (manufactured by Sigma-Aldrich) and P$_2$S$_5$ (manufactured by Sigma-Aldrich) were weighed to result in a molar ratio of Li$_2$S: P$_2$S$_5$=0.75:0.25, and they were then mixed with each other in an agate mortar. Subsequently, the obtained mixture was poured into a 45-mL zirconia-made pot, then zirconia-made balls (φ: 5 mm, 62 g) were placed therein, and the pot was then completely hermetically sealed. This pot was equipped in a planetary ball mill (manufactured by Fritsch, P7), and was then subjected to mechanical milling at a rotation number of 510 rpm for 45 hours, to obtain an ionic conductor (0.75 Li$_2$S-0.25 P$_2$S$_5$).

Furthermore, in a glove box in an argon atmosphere, LiBH$_4$ (manufactured by Sigma-Aldrich, purity 95%) and the above-obtained 0.75 Li$_2$S-0.25 P$_2$S$_5$ were mixed in an agate mortar, to result in a molar ratio of LiBH$_4$: (0.75 Li$_2$S-0.25 P$_2$S$_5$)=0.33:0.67. Subsequently, the obtained mixture was poured into a 45-mL zirconia-made pot, then zirconia-made balls (φ: 5 mm, 62 g) were placed therein, and the pot was then completely hermetically sealed. This pot was equipped in a planetary ball mill (manufactured by Fritsch, P7), and was then subjected to mechanical milling at a rotation number of 510 rpm for 15 hours, to obtain an ionic conductor [0.33 LiBH$_4$-0.67 (0.75 Li$_2$S-0.25 P$_2$S$_5$)]. The thus obtained ionic conductor was not in the form of a crystal but a glass.

<X-Ray Diffraction Measurement>

Powders of the ionic conductors obtained in Examples 1 to 4 and Comparative Examples 1 to 4 were subjected to X-ray diffraction measurement (manufactured by PANalytical, X'pert Pro, CuKα: λ=1.5405 Å) in an Ar atmosphere at room temperature. The obtained diffraction peaks are shown in FIG. 1. FIG. 1 also shows the diffraction peaks of P$_2$S$_5$ for comparison.

In Examples 1 to 4, diffraction peaks were observed, at least, at 2θ=14.4 deg, 15.0 deg, 24.9 deg, 29.2 deg, 30.3 deg, 38.7 deg, 43.9 deg, 46.6 deg, 51.1 deg, 53.5 deg, 60.6 deg, and 65.8 deg.

In Example 3 (x=0.95) and Example 2 (x=0.975), it is found that the peaks of LiBH$_4$ were also present. In Example 1 (x=0.90), the peaks of LiBH$_4$ disappeared, and thus, it is considered that almost a single phase pattern was obtained. In Comparative Examples 1 to 3 (x=0.85 or less), almost no peaks were observed, and thus, it can be said that crystallization did not occur. In addition, the X-ray diffraction peaks of the ionic conductor of Comparative Example 6 were also measured in the same manner as described above. As a result, almost no peaks could be confirmed. Accordingly, it can be said that crystallization did not occur also in Comparative Example 6.

<Raman Spectroscopy>

Figure 2A:
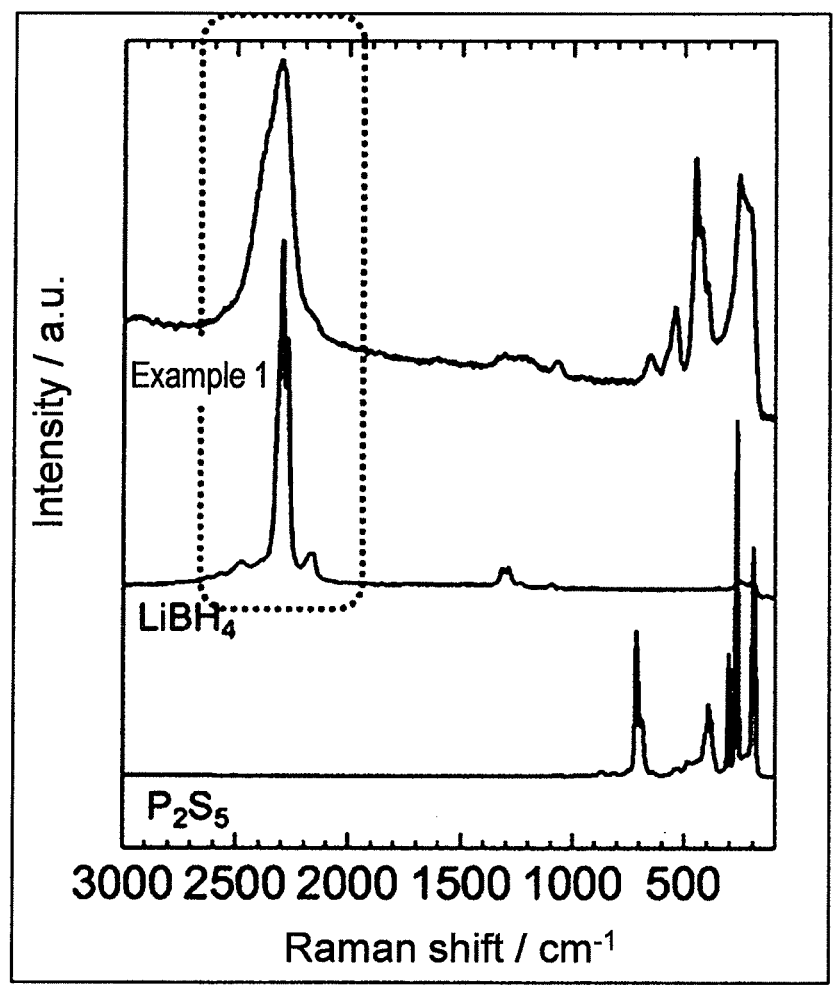
FIG. 2A is a view showing the results obtained by analyzing the ionic conductor obtained in Example 1 by Raman spectroscopy.
Figure 2B:
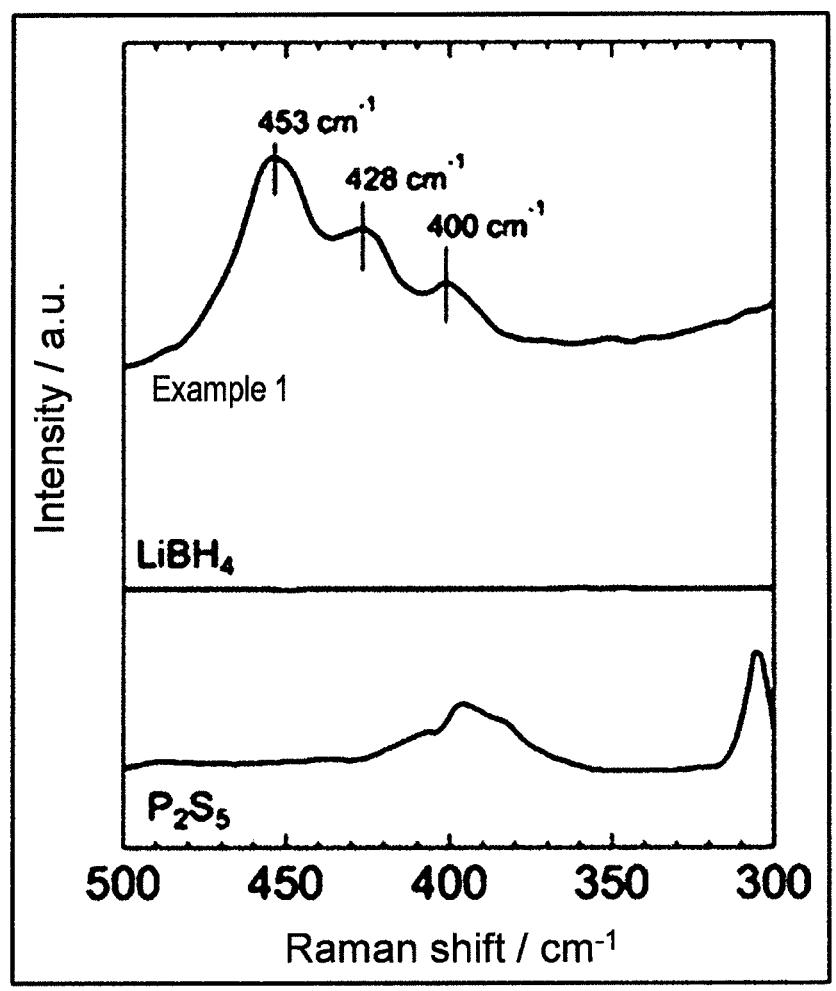
FIG. 2B is a partially enlarged view of FIG. 2A.

Powders of the ionic conductor obtained in Example 1 were subjected to Raman spectroscopy (manufactured by Thermo Fisher SCIENTIFIC, NICOLET ALMEGA, λ=532 nm) at room temperature. The results are shown in FIG. 2A. It is to be noted that FIG. 2B is an enlarged view of a portion of 500 to 300 cm$^{-1}$ in FIG. 2A. FIG. 2 also shows the measurement results of P$_2$S$_5$ and LiBH$_4$ for comparison. As shown in FIG. 2A, in the ionic conductor obtained in Example 1, a large peak derived from borohydride (BH$_4^-$) was detected around 2300 cm$^{-1}$. Moreover, as shown in FIG. 2B, three characteristic peaks were detected at 453 cm$^{-1}$, 428 cm$^{-1}$ and 400 cm$^{-1}$.

<Measurement of Ion Conductivity>

The ionic conductors obtained in Examples 1 to 4 and Comparative Examples 1 to 5 were subjected to uniaxial molding (240 MPa) to obtain disks each having a thickness of about 1 mm and a φ value of 8 mm. AC impedance measurement (HIOKI 3532-80, a chemical impedance meter) was carried out according to a two-terminal method of utilizing lithium electrodes with intervals of 10° C., in a temperature range from room temperature to 150° C., so that ion conductivity was calculated. The measuring frequency range was set at 4 Hz to 1 MHz, and the amplitude was set at 100 mV.

Figure 3:
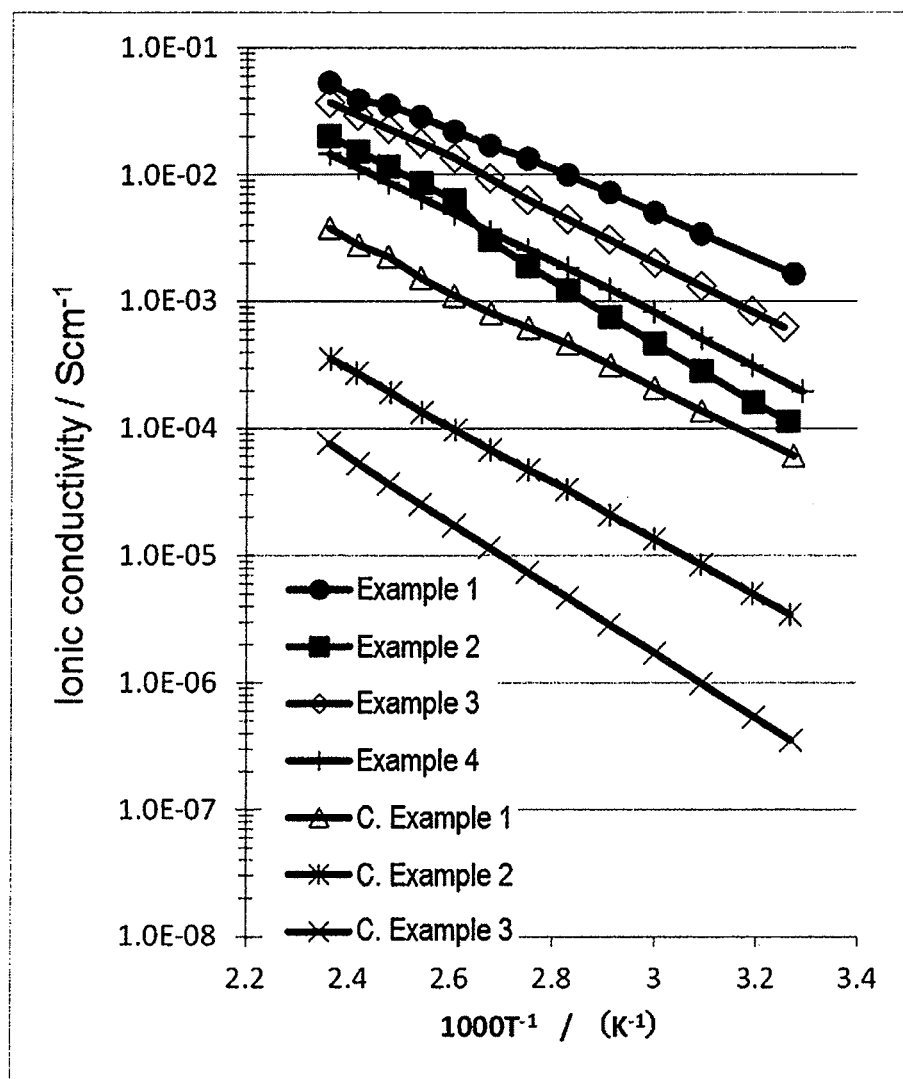
FIG. 3 is a view showing the ion conductivity of each of the ionic conductors obtained in Examples 1 to 4 and Comparative Examples 1 to 3.
Figure 4:
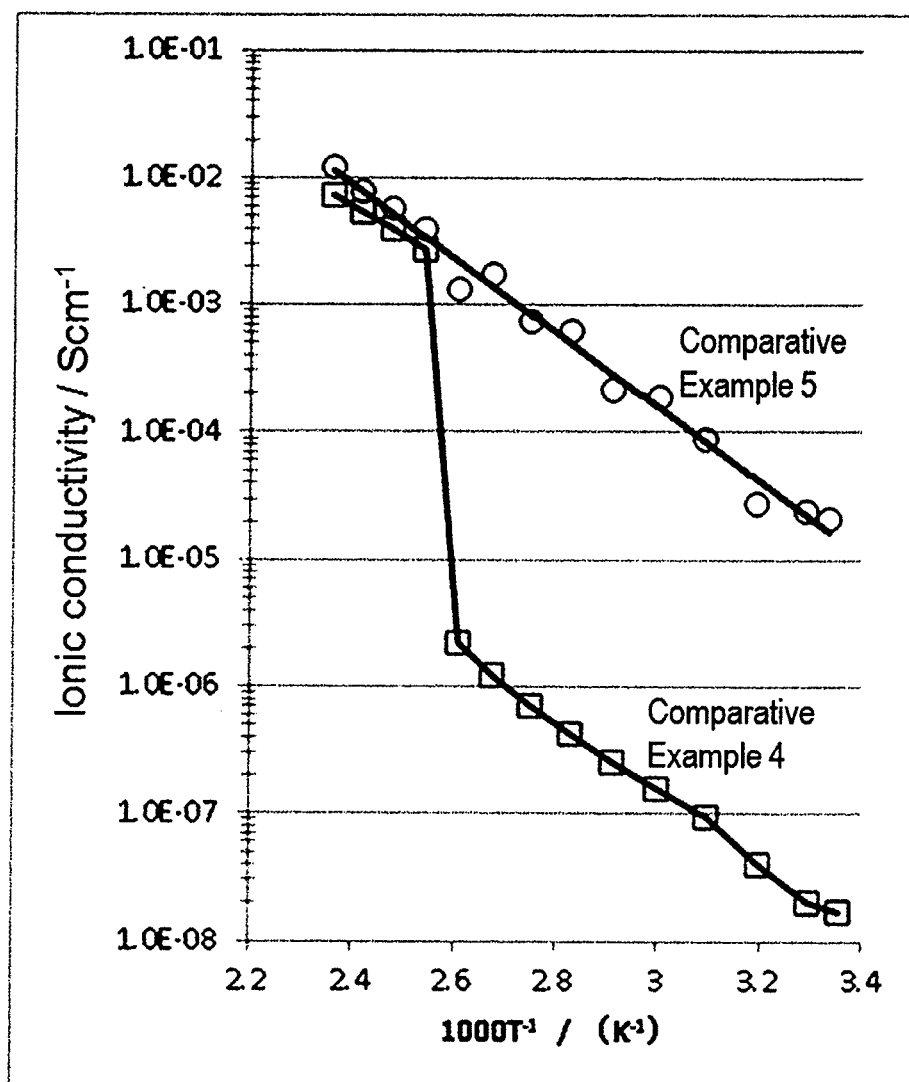
FIG. 4 is a view showing the ion conductivity of each of the ionic conductors obtained in Comparative Examples 4 and 5.

The measurement results of the ion conductivity of each of the ionic conductors obtained in Examples 1 to 4 and Comparative Examples 1 to 3 are shown in FIG. 3, and the measurement results of the ion conductivity of each of the ionic conductors obtained in Comparative Examples 4 and 5 are shown in FIG. 4. In the ionic conductors of Examples 1 to 4 and Comparative Examples 1 to 3, which had been produced by mixing LiBH$_4$ with P$_2$S$_5$, a rapid decrease in the ion conductivity at a temperature of lower than 115° C., which was observed in LiBH$_4$ (Comparative Example 4), did not take place. In addition, in the case of the ionic conductors having characteristic X-ray diffraction peaks, such as those of Examples 1 to 4, the ionic conductors exhibited ion conductivity higher than that of 0.75 LiBH$_4$-0.25 LiI (Comparative Example 5) at all of the measured temperatures.

Moreover, when the ionic conductor of Example 1 was compared with the ionic conductor of Comparative Example 6, it was found that the ionic conductor of Example 1 had excellent ion conductivity, in particular, in a lower temperature region.

<Measurement of Interfacial Resistance>

The ionic conductors obtained in Example 1 and Comparative Example 6 were subjected to uniaxial molding (240 MPa) to obtain disks each having a thickness of about 1 mm and a φ value of 8 mm. AC impedance measurement (manufactured by Solartron, SI 1260, data processing: ZView2) was carried out according to a two-terminal method of utilizing lithium electrodes under conditions of 25° C., so that interfacial resistance was calculated. The measuring frequency range was set at 0.1 Hz to 1 MHz, and the amplitude was set at 50 mV.

The interfacial resistance of each of the ionic conductors of Example 1 and Comparative Example 6 is shown in Table 1. In Example 1, a frequency of 100 k to 1 MHz was defined as the bulk resistance of the ionic conductor, 7943 to 79433 Hz was defined as a resistance component derived from the interface of lithium/ionic conductor, and the interfacial resistance was calculated using the "Fit Circle" function of Zview2. As a result, the measured resistance value of a measurement cell (a lithium/ionic conductor/lithium symmetric cell) was 0.7Ω, and the interfacial resistance value of the lithium/ionic conductor was 0.18 Ωcm$^2$. Since the Li symmetric cell was used in the measurement, the measured resistance value of the measurement cell derived from the interfacial resistance is obtained as a value 2-fold greater than the "interfacial resistance value of a Li/solid electrolyte." Accordingly, the interfacial resistance value is obtained by the formula: interfacial resistance value=[measured resistance value of measurement cell (unit: Ω)× disk area (unit: cm$^2$)÷2]. In Comparative Example 6, a frequency of 10 k to 1 MHz was defined as the bulk resistance of the solid electrolyte, 7.9433 to 7943 Hz was defined as a resistance component derived from the interface of lithium/ionic conductor, and the interfacial resistance was calculated using the "Fit Circle" function. As a result, the measured resistance value of the measurement cell was 64.6Ω, and the interfacial resistance value of the lithium/ionic conductor was 16 Ωcm$^2$. From these results, it was found that the solid electrolyte described in Example 1 had a significantly small interfacial resistance.

TABLE 1

| | Frequency Hz | Measured resistance value of interfacial resistance measurement cell Ω | Interfacial resistance value of Li/solid electrolyte Ω cm$^2$ |
|---|---|---|---|
| Example 1 | 7943~79433 | 0.7 | 0.18 |
| Comp. Ex. 6 | 7.9433~7943 | 64.6 | 16 |

Figure 5:
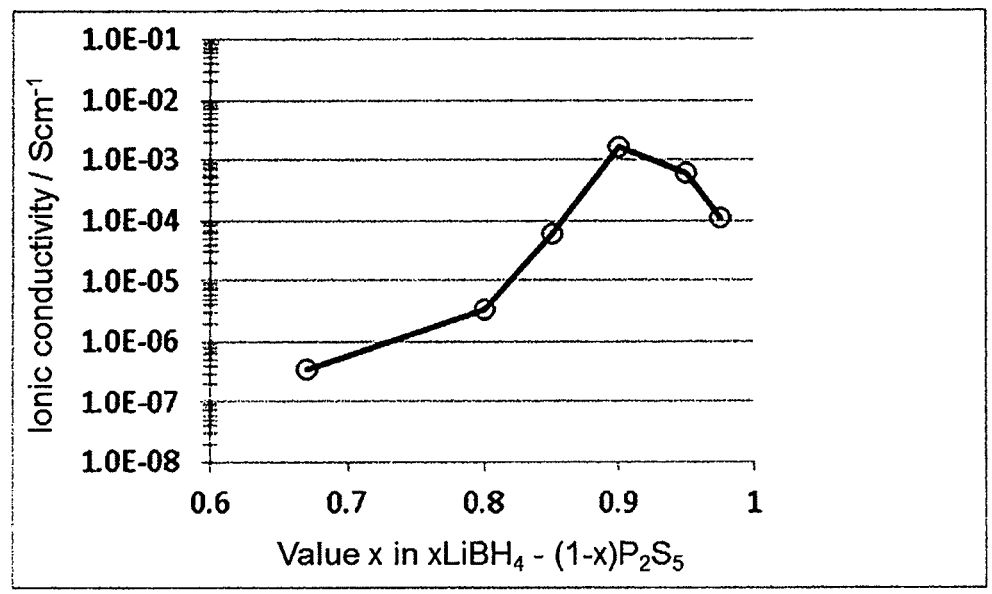
FIG. 5 is a view showing the relationship between the molar ratio between $LiBH_4$ and $P_2S_5$ to be added upon the production of an ionic conductor, and ion conductivity.

FIG. 5 is a view obtained by plotting the relationship between the molar ratio between LiBH$_4$ and P$_2$S$_5$ to be added upon the production of each of the ionic conductors obtained in Examples 1 to 3 and Comparative Examples 1 to 3, and ion conductivity at a measurement temperature of 300 K (27° C.). In the case of x=0.90 (Example 1) at which almost a single phase X-ray diffraction pattern is obtained, ion conductivity becomes highest, and it is found that the ionic conductors of Examples 1 to 3 had extremely good ion conductivity at about room temperature, in comparison to the ionic conductors of Comparative Examples 1 to 3.

<Cyclic Voltammetry>

Figure 6:
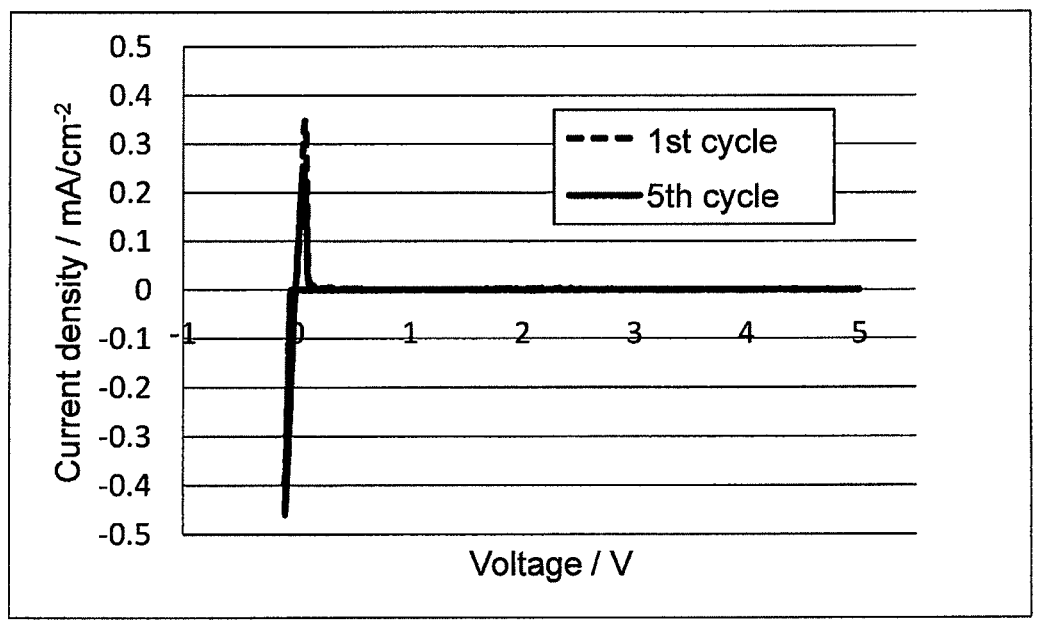
FIG. 6 is a view showing the results obtained by measuring the ionic conductor obtained in Example 1 by cyclic voltammetry.

The ionic conductor obtained in Example 1 was subjected to uniaxial molding (240 MPa) to obtain a disk having a thickness of about 1 mm and a φ value of 8 mm. A metallic lithium foil with φ of 8 mm was attached to one surface of the disk, and the other surface was allowed to come into contact with a SUS304 current collector, so as to prepare a battery test cell. Using Potentiostat/galvanostat (manufactured by Scribner Associate, 580), cyclic voltammetry was carried out at a temperature of 27° C. and a sweep rate of 2 mV/sec. Sweeping was carried out from a spontaneous potential (which was 1.8 V) to −0.1 V, and sweeping was further carried out to 5 V. Then, sweeping was carried out to the initial spontaneous potential (1.8 V). This operation was defined as 1 cycle, and 5 cycles were carried out. FIG. 6 shows the plots of the 1st cycle and the 5th cycle. In FIG. 6, peaks other than those corresponding to the precipitation and dissolution of lithium around 0 V were not observed. Therefore, it is found that the ionic conductor obtained in Example 1 has a wide potential window, and by using this ionic conductor, a battery having a higher voltage can be obtained.

<Measurement of Crushing Strength of Solid Electrolyte Layer>

The ionic conductors obtained in Example 1 and Comparative Example 6 were subjected to uniaxial molding (240 MPa) to obtain disk-shaped solid electrolyte layers (samples) each having a thickness of about 1 mm and a φ value of 8 mm. In a glove box in an argon atmosphere, the obtained disk-shaped solid electrolyte layers were each placed in a Lamizip with high gas barrier properties and were then sealed. Thereafter, they were then removed from the glove box, and were immediately subjected to a crushing strength test. The test was carried out using STROGRAPH E-S (manufactured by Toyo Seiki Seisaku-Sho, Ltd.) at a speed range of 5 mm/min and at a load range of 2.5 kgf. The sample placed in the Lamizip was placed on a metallic board having a groove of 4.5 mm, such that the groove was overlapped with the center of the sample. From above, a metallic bar with a width of 3 mm was pressed against the central portion of the sample, and the pressing bar of the testing machine was then set, such that the pressing bar was pressed against the aforementioned metallic bar. Thereafter, crushing strength was measured four times for each sample. Table 2 shows the crushing strengths of each ionic conductor and the average thereof.

From these results, it is found that the molded product of the ionic conductor of Example 1 is excellent in terms of mechanical strength.

TABLE 2

| | Crushing strength (kgf) | | | | |
|---|---|---|---|---|---|
| Ionic conductor | 1st | 2nd | 3rd | 4th | Average |
| Example 1 | 1.87 | 1.51 | 2.17 | 1.63 | 1.79 |
| Comp. Ex. 6 | 1.28 | 1.36 | 1.04 | 0.994 | 1.17 |

<Charge-Discharge Test 1>
(Preparation of 3LiBH$_4$—LiI Solid Electrolyte)

In a glove box in an argon atmosphere, LiBH$_4$ (manufactured by Aldrich, purity: 90%) and LiI (manufactured by Aldrich, purity: 99.999%) were mixed with each other in an agate mortar to result in a molar ratio of LiBH$_4$: LiI=3:1. Subsequently, the mixed starting material was poured into a 45-mL SUL-2-made pot, and further, SUL-2-made balls (φ: 7 mm, 20 balls) were also placed therein. Thereafter, the pot was completely hermetically sealed. This pot was equipped in a planetary ball mill (manufactured by Fritsch, P7), and was then subjected to mechanical milling at a rotation number of 400 rpm for 1 hour, to obtain a complex hydride solid electrolyte (3LiBH$_4$—LiI).

(Preparation of Powders of Positive Electrode Layer)

As an ionic conductor, 0.90 LiBH$_4$-0.10 P$_2$S$_5$ obtained in Example 1 was used. Powders comprising cathode active material TiS$_2$ (manufactured by Sigma-Aldrich, purity: 99.9%): ionic conductor (Example 1)=2:3 (weight ratio)

were weighed in a glove box, and the powders were then blended in a mortar, to obtain powders of positive electrode layer.

(Preparation of all-Solid-State Battery)

The powders of the above-prepared complex hydride solid electrolyte 3LiBH$_4$—LiI were placed in a powder tablet-making machine with a diameter of 8 mm, and were then press-molded into disk-shaped products under a pressure of 28 MPa. Without removing the molded products from the machine, the powders of the ionic conductor 0.90 LiBH$_4$-0.10 P$_2$S$_5$ prepared in Example 1 were also placed in the tablet-making machine, and were then press-molded again under a pressure of 28 MPa. Thereafter, the above-prepared positive electrode layer powders were further placed in the machine, and they were then integrally molded under a pressure of 240 MPa. Thus, a disk-shaped pellet, in which the positive electrode layer (70 μm), the 0.90 LiBH$_4$-0.10 P$_2$S$_5$ solid electrolyte layer (400 μm) and the 3LiBH$_4$—LiI solid electrolyte layer (100 μm) were successively laminated on one another, was obtained. To this pellet, a metallic lithium foil (a negative electrode layer) having a thickness of 200 μm and a φ value of 8 mm was attached, and the resultant was then placed in a SUS304-made battery test cell, so as to prepare an all-solid-state rechargeable battery.

(Charge-Discharge Test)

Figure 7:
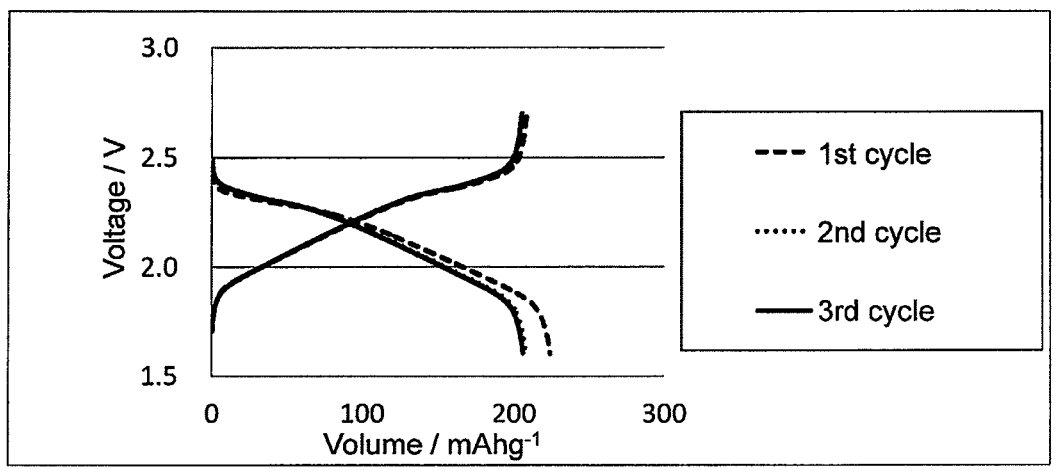
FIG. 7 is a view showing the charge-discharge plot of an all-solid-state battery produced using the ionic conductor obtained in Example 1 (Charge-discharge test 1).

The above-prepared all-solid-state battery was subjected to a charge-discharge test, using Potentiostat/galvanostat (manufactured by Scribner Associate, 580), at a constant current, under conditions of a measurement temperature of 27° C., a cutoff voltage of 1.6 to 2.7 V, and a current density of 0.057 mA/cm$^2$ (0.05 C). The charge-discharge plots from the 1st cycle to the 3rd cycle are shown in FIG. 7.

<Charge-Discharge Test 2>

Figure 8:
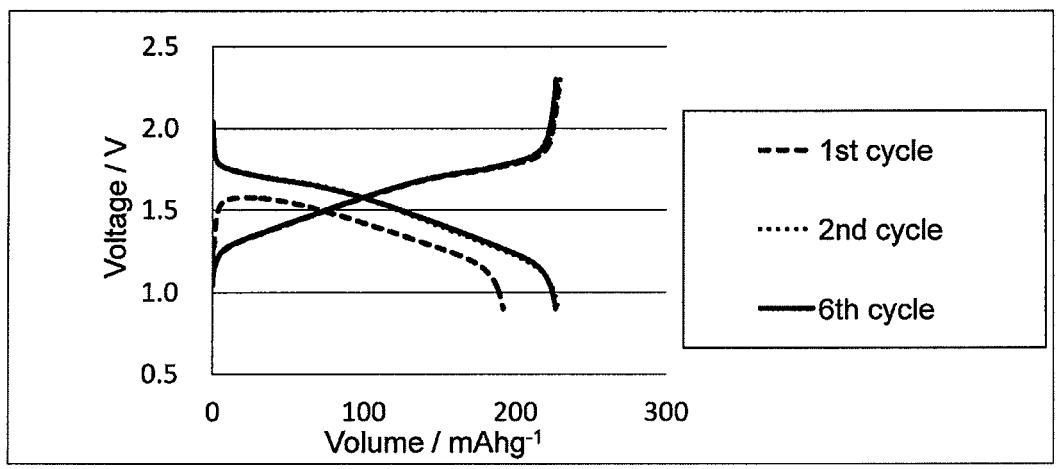
FIG. 8 is a view showing the charge-discharge plot of an all-solid-state battery produced using the ionic conductor obtained in Example 1 (Charge-discharge test 2).

A charge-discharge test was carried out in the same manner as that of the above described <Charge-discharge test 1>, with the exception that a Li—In alloy was used as a negative electrode layer of the all-solid-state battery. Onto the surface of a 3LiBH$_4$—LiI solid electrolyte layer in the disk-shaped pellet prepared in the above <Charge-discharge test 1>, on which a positive electrode layer and a solid electrolyte layer had been laminated, a metallic In foil having a thickness of 100 μm and a φ value of 8 mm was adhered, and thereafter, onto the metallic In foil, a metallic lithium foil having a thickness of 200 μm and a φ value of 8 mm was adhered, so as to prepare a Li—In alloy negative electrode layer. The obtained laminate body was placed in a battery test cell made of SUS304, to obtain an all-solid-state rechargeable battery. In order to form a Li—In alloy, the prepared battery test cell was subjected to a heat treatment at 120° C. for 2 hours, and thereafter a charge-discharge test was carried out. The charge-discharge plots on the 1st, 2nd and 6th cycles are shown in FIG. 8.

From the results of the charge-discharge test, it is found that a normally operable all-solid-state rechargeable battery can be produced by using the ionic conductor according to the present embodiment.

Several embodiments of the present invention are described above. However, these embodiments are merely provided for illustrative purposes, and the embodiments are not intended to limit the scope of the present invention. These novel embodiments can be carried out in various other modes, and various omissions, substitutions, and alternations can also be carried out, unless they are deviated from the gist of the invention. These embodiments and the modifications thereof are included in the scope or gist of the present invention, and are also included in the inventions recited in the scope of claims and scopes equivalent thereto.

The invention claimed is:

1. An ionic conductor comprising lithium (Li), borohydride (BH$_4^-$), phosphorus (P), and sulfur (S), wherein, in X-ray diffraction (CuKα: λ=1.5405 Å), the ionic conductor has diffraction peaks, at least, at 2θ=14.4±1.0 deg, 15.0±1.0 deg, 24.9±1.0 deg, 29.2±1.5 deg, 30.3±1.5 deg, 51.1±2.5 deg and 53.5±2.5 deg.

2. A method for producing an ionic conductor, which comprises mixing LiBH$_4$ and P$_2$S$_5$ at a molar ratio of LiBH$_4$:P$_2$S$_5$=x: (1−x) [wherein x is greater than 0.85 and 0.98 or less] to obtain a mixture, and subjecting the mixture to a heat treatment, wherein the ionic conductor comprises lithium (Li), borohydride (BH$_4^-$), phosphorus (P), and sulfur (S), and has diffraction peaks, at least, at 2θ=14.4±1.0 deg, 15.0±1.0 deg, 24.9±1.0 deg, 29.2±1.5 deg, 30.3±1.5 deg, 51.1±2.5 deg and 53.5±2.5 deg in X-ray diffraction (CuKα: λ=1.5405 Å).

3. The method for producing an ionic conductor according to claim 2, wherein the temperature applied in the heat treatment is 50° C. to 300° C.

4. The method for producing an ionic conductor according to claim 3, wherein the temperature applied in the heat treatment is 60° C. to 200° C.

5. The method for producing an ionic conductor according to claim 2, wherein the mixing is carried out in an inert gas atmosphere.

6. A solid electrolyte for all-solid-state batteries, comprising the ionic conductor according to claim 1.

7. An all-solid-state battery comprising the solid electrolyte for all-solid-state batteries according to claim 6.

8. The method for producing an ionic conductor according to claim 3, wherein the mixing is carried out in an inert gas atmosphere.

9. The method for producing an ionic conductor according to claim 4, wherein the mixing is carried out in an inert gas atmosphere.

* * * * *